Patented Aug. 27, 1929.

1,726,001

UNITED STATES PATENT OFFICE.

SVEN EMIL SIEURIN AND ALFRED SIGURD EDLUND, OF HOGANAS, SWEDEN.

PROCESS OF PURIFYING ALUMINUM OXIDE.

No Drawing. Application filed April 27, 1926, Serial No. 105,013, and in Sweden May 27, 1925.

During the last decades various experiments have been made for obtaining from a raw material, containing oxide of aluminum, by melting and reducing in an electric furnace a product of a purity sufficient for the production of aluminum. To be adapted for such a production the percentage of the impurities must be a very small one, and the percentage of oxide of iron, which suitably may not surpass 0.1–0.2%, is especially dangerous. The percentage of silicic acid again is not so serious, especially if the aluminum is intended to be used in some aluminum-silicon alloys, which more and more have come into use in later times.

The raw materials containing oxide of aluminum, which especially may be considered, are bauxites of different kinds and clays. The substances contained in these raw materials are, besides oxide of aluminum, especially silicic acid and oxide of iron. It has been proposed that during the melting process in the electric furnace carbon be added in such a quantity, that an almost complete reduction of the silicic acid and the oxide of iron takes place, which substances in the form of ferrosilicon sink to the bottom of the molten bath, while the oxide of aluminum remains above the metal alloy in the form of a slag. When the furnace is completely charged the ferrosilicon as well as the oxide of aluminum are let out. In this manner it is, however, not possible to obtain any high degree of purity of the oxide of aluminum, but a percentage of iron oxide under 1% is only a happy exception, as the percentage of that oxide usually is larger.

It is, however, impossible in the practice during the melting period to know exactly whether the reducing agent is present in the molten mass in excess or an amount less than a chemical equivalent for which reason it is suitable to conduct the melting operation in such a manner that a certain amount less than a chemical equivalent of the reducing agent will certainly be present, and thereupon, at the final refining operation (when the process is almost finished) to add a quantity of such a reducing agent greater than that required for the complete reduction of the impurities. It becomes then very easy to produce the desired excess of the reducing agent in the molten mass by means of a final carburizing operation. The present process is based upon the condition now described and gives more advantageous results than the processes hitherto used. It is carried out in the following manner:

When the melting of the raw material and of the reducing material in quantities approximately proportioned to produce the reduction of impurities has taken place for so long a time that the treatment of the charge is almost accomplished, there is added a fresh quantity of carbonaceous reducing material, sufficient to introduce in the finished product a quantity of carbon larger than that required for the reduction at a continued treatment in the furnace of all the impurities contained in the said product. When such an addition is made the carbon also will decompose the oxide of aluminum and form carbide of aluminum. When cooled the oxide of aluminum will crystallize in a pure state, while the carbide of aluminum contains the principal part of the impurities. At this powerful reduction of the bath with an excess of carbon a purer oxide of aluminum is obtained than if oxidizing conditions were prevalent therein. Still better results are, however, attainable by a special additional treatment, consisting therein that after the furnace is ready for tapping a mixture of iron ore and a carbonaceous material, required for its reduction, is added. The iron ore will then be dissolved in the aluminum oxide slag and iron will almost instantaneously be precipitated in a fine shower, which rapidly sinks to the bottom of the molten mass, carrying with it the last traces of the metals suspended in the said mass. The reason for the percentage of iron which in most cases is to be found in the oxide of aluminum produced in the usual way, is that the iron therein is present as silicon-iron of about the same specific weight as the melted oxide of aluminum. When drops of a rather pure iron meet such light alloys, the heavier iron takes with it the specific lighter alloys to the bottom of the molten oxide of aluminum. When that molten oxide is tapped out from the furnace it may suitably be granulated in water, whereby the product will become more easily crushed.

The oxide of aluminum obtained, which appears as pure crystals, contains a greater or less portion of carbide of aluminum with the greater part of the impurities, and moreover a portion of very small balls, principally consisting of ferrosilicon and situated between the said crystals. The oxide of aluminum, granulated or not, is suitably treated with an acid, for instance sulphuric acid or hydrochloric acid, whereby the carbide of aluminum with its impurities becomes at once decomposed and the last traces of metal alloys are dissolved. This treatment suitably may be carried out in such a manner that the crushed oxide of aluminum first is treated with sulphuric acid of for instance 1.71 sp. w. whereby all the carbide is decomposed, while the balls (ferrosilicon) before mentioned are not decomposed in any degree worthy of consideration. In this manner a marketable sulphate of aluminum with a relatively low percentage of iron is produced, which may be separated from the oxide of aluminum, for instance by filtration in a filter press, whereupon the oxide of aluminum is treated with diluted sulphuric acid or with hydrochloric acid (concentrated or diluted), whereby the last traces of the metallic impurities are dissolved. After washing and drying the product (oxide of aluminum) is ready for the production of metallic aluminum. The percentage of iron in this way may be decreased to under 0.1%.

Having now particularly described the nature of our invention and the manner of its operation, what we claim is:

1. A process for purifying oxide of aluminum which comprises melting in an electric furnace a mixture of a raw material containing such oxide and a reducing agent, the quantity of the reducing agent being so proportioned that there is a deficiency of reducing agent present during the melting, and adding to the molten mass, when the treatment is almost accomplished, a carbonaceous reducing agent in excess of the quantity required to reduce all the impurities contained in said molten mass.

2. A process for purifying oxide of aluminum which comprises melting in an electric furnace a mixture of a raw material containing such oxide and a reducing agent, the quantity of the reducing agent being so proportioned that there is a deficiency of reducing agent present during the melting, adding to the molten mass, when the treatment is almost accomplished, a carbonaceous reducing agent in excess of the quantity required to reduce all the impurities contained in said molten mass, and adding to the molten mass after the reduction by the added reducing agent a quantity of iron ore and quantity of carbon for the reduction of the said iron ore.

3. The process recited in claim 2 together with the step of drawing off from the furnace the molten oxide of aluminum and granulating the same.

4. The process recited in claim 2 together with the step of drawing off the molten oxide of aluminum and treating it with a strong acid.

5. The process recited in claim 2 together with the steps of drawing off the molten oxide of aluminum, treating it with sulphuric acid of such a concentration that the iron contained therein is not materially dissolved, and then dissolving out from the oxide of aluminum all the iron contained therein by treating said oxide with a diluted strong acid.

In testimony whereof we affix our signatures.

SVEN EMIL SIEURIN.
ALFRED SIGURD EDLUND.